Aug. 14, 1956     C. L. GRAHAM     2,758,805
BLAST DEFLECTOR ARRANGEMENT FOR JET PROPELLED AIRCRAFT
Filed March 18, 1952     3 Sheets-Sheet 1
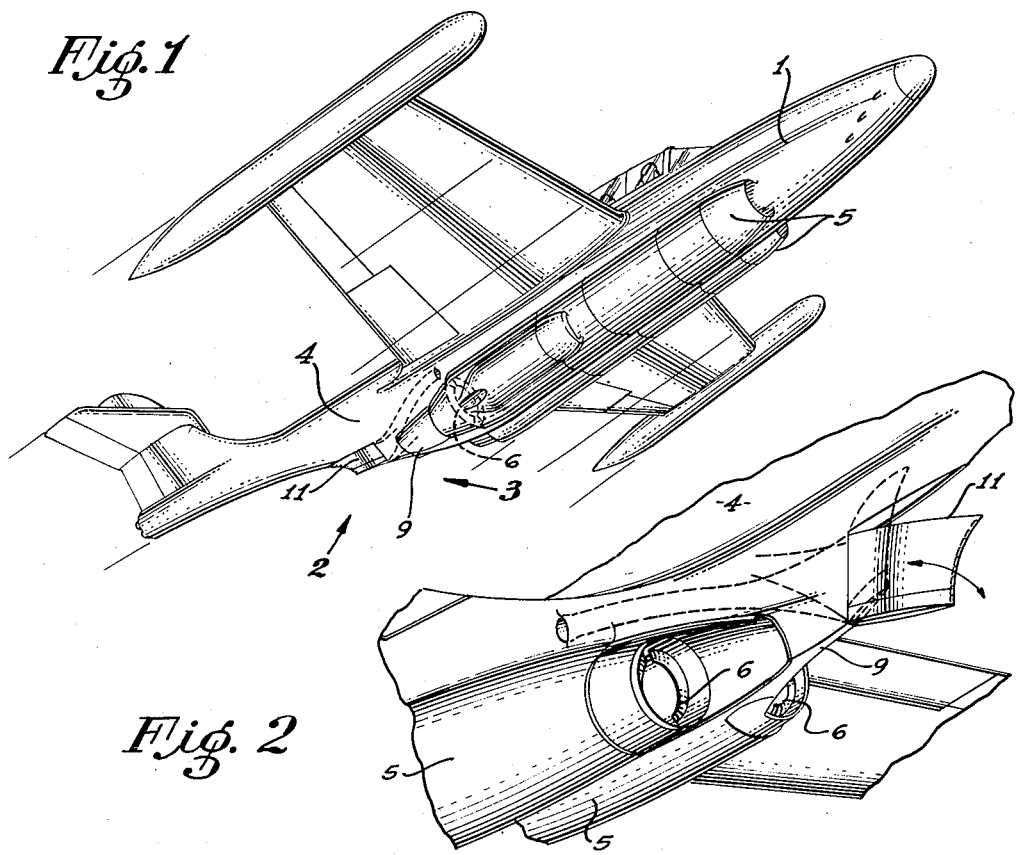
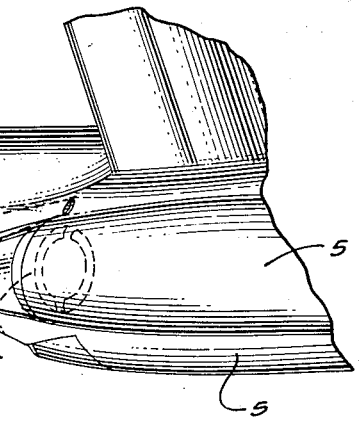
INVENTOR:
CONNELLY L. GRAHAM
By Hubert E. Metcalf
HIS PATENT ATTORNEY

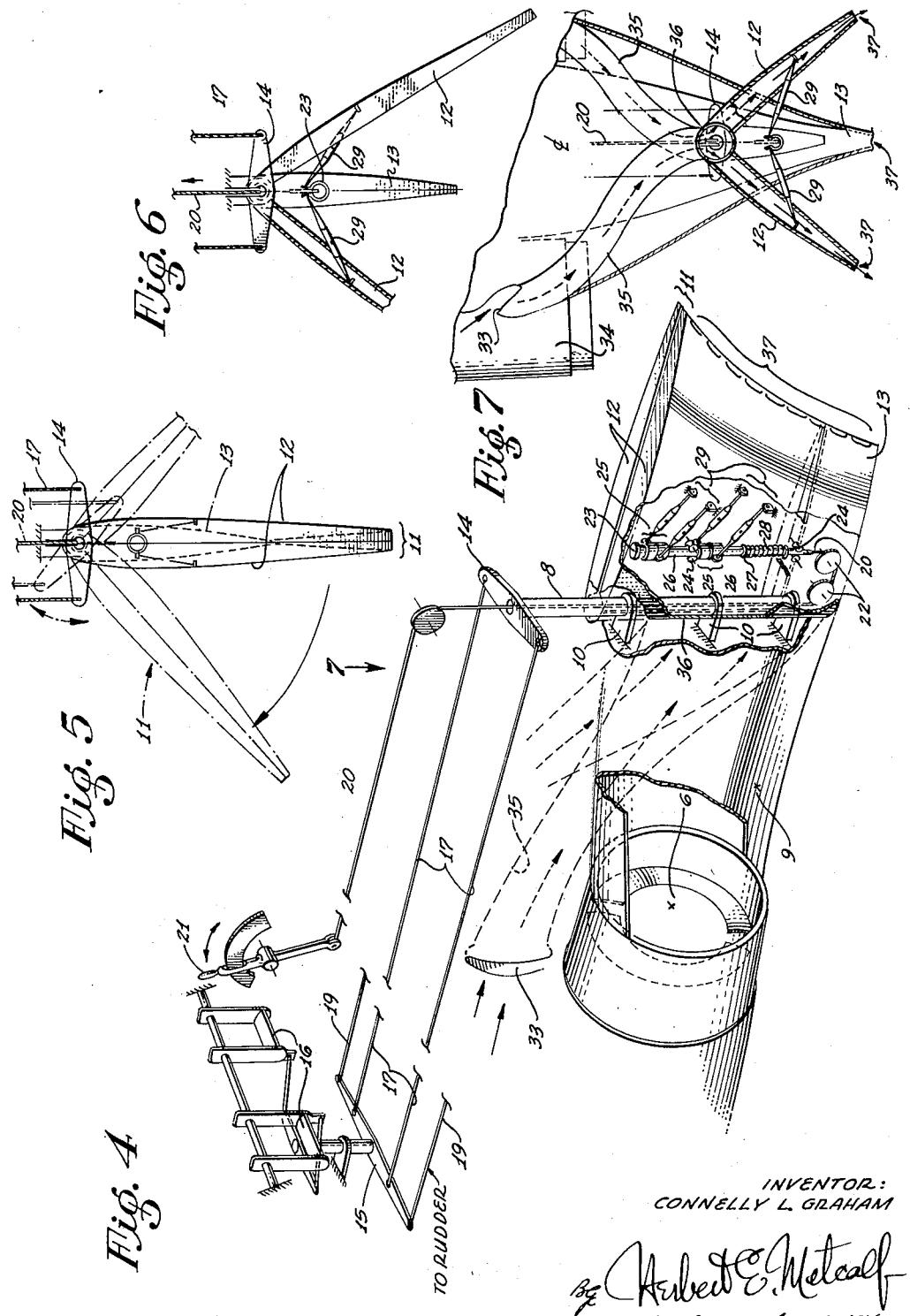

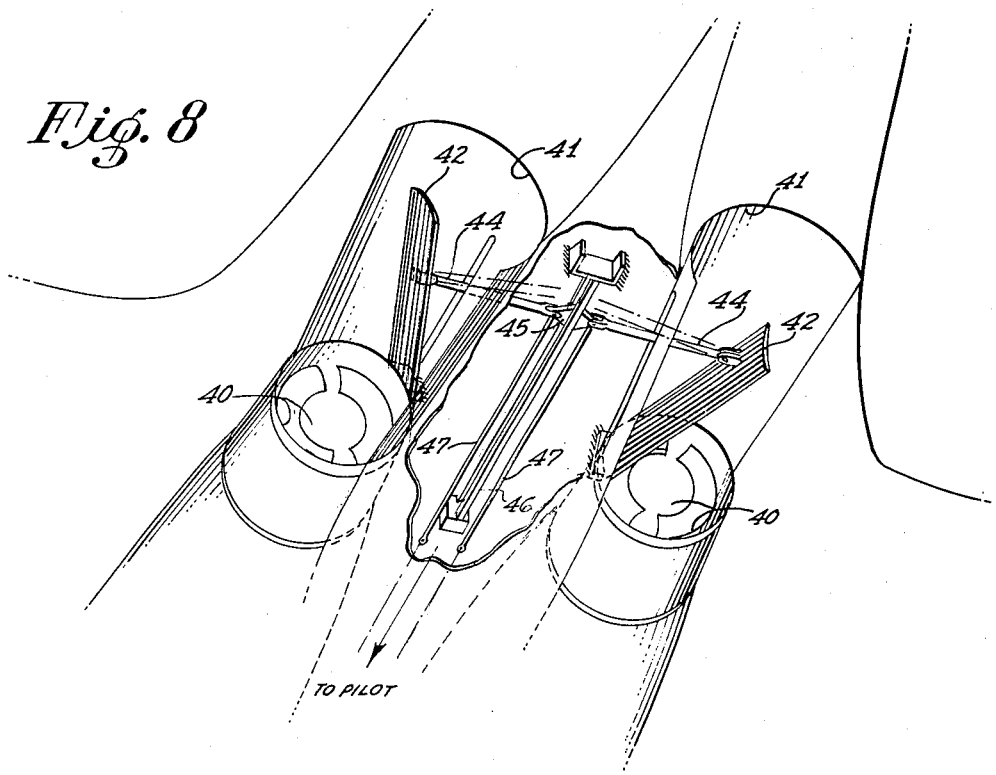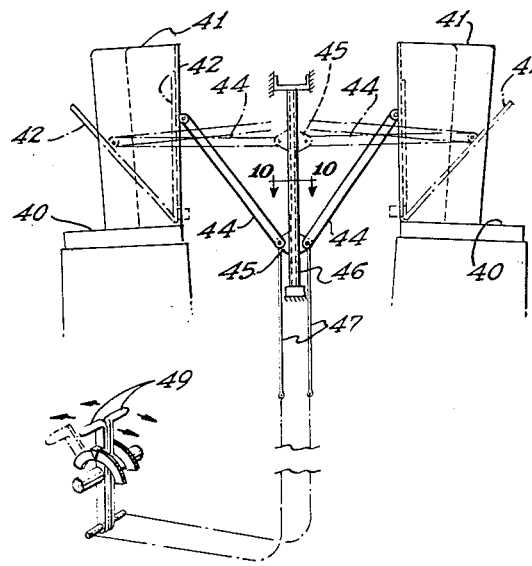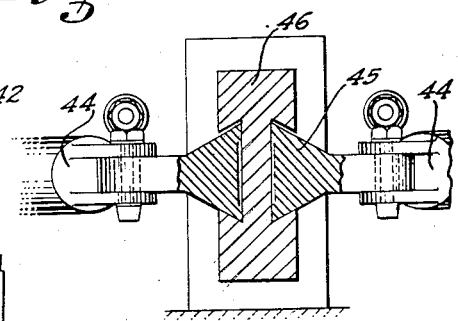

United States Patent Office 2,758,805
Patented Aug. 14, 1956

2,758,805

BLAST DEFLECTOR ARRANGEMENT FOR JET PROPELLED AIRCRAFT

Connelly L. Graham, Covina, Calif., assignor to Northrop Aircraft, Inc., Hawthorne, Calif., a corporation of California Application March 18, 1952, Serial No. 277,255

5 Claims. (Cl. 244—52)

My invention relates to jet propeller airplanes and more particularly to a means for controlling the forward thrust of the propelling jets.

In an airplane propelled by gaseous combustion jet engines, commonly called turbo-jet engines, a rearwardly directed jet of expanding hot gases is used to give the airplane a propelling thrust. Due to the relatively high weight of the rotating compressor and turbine portions of the engine, and to other factors known to those skilled in the art, an appreciable period of time must elapse during the acceleration of the engine from idling to full power, for example.

The present invention has as an object the provision of a means and method whereby the forward propulsive thrust of a jet from a jet engine, used to propel said airplane, can be changed substantially instantaneously.

Another object of the invention is to provide a means and method of controlling the speed of an airplane driven by jets from jet engines by changing the forward thrusts of the jets independently of the jet output of the engines.

It is another object of the invention to provide means for spoiling the thrust of the blast of jets propelling an airplane.

It is still another object of the invention to provide in a jet engine driven airplane, jet direction controlling means that can aid in the directional control of airplanes.

In brief, the present invention is preferably applied to an aircraft where twin jet engines are positioned relatively close together as would occur if the engines were to be installed below the airplane fuselage, or in a twin engine nacelle in or below the wing panels. A fairing is continued past the jet outlets between the jet blasts, to terminate in a movable portion comprising a pair of vertical panels movable as a whole to right or left to divert one or the other of the jets blasts laterally for steering; these panels also being separable, with each respective panel being movable laterally in opposite directions to divert both jet blasts laterally in opposite directions, thereby spoiling the forward thrust of the blasts.

However, the present invention is also applicable to airplanes having twin jet engines spaced laterally from the longitudinal axis of the airplane. In this case a deflector is installed inboard of each jet blast adjacent the ends of the engine tail pipe, and means are provided to swing the deflectors outwardly to deflect one or both of the jet blasts laterally to provide steering or thrust reduction, respectively.

Thrust reduction is highly useful during landing procedures in that the jet engines can be left running at relatively high R. P. M. and thrust in the landing approach, with the forward thrust reduced and controlled mainly by the thrust spoilers alone. Then, in case of a balked landing for example, the thrust control panels can be substantially instantaneously closed (aided by the jet thrust against them) and full forward jet thrust (immediately resumed) without having to wait for the jet engines to accelerate, as would be necessary under normal circumstances.

My invention will be more fully understood by reference to the drawings in which:

Figure 1 is a perspective view of a U. S. A. F. F-89 fighter airplane, embodying one form of the present invention.

Figure 2 is a fragmentary perspective view of the airplane of Figure 1 showing the present invention in use as a rudder.

Figure 3 is a fragmentary perspective view of the airplane of Figure 1 showing one form of the present invention in use as a thrust spoiler.

Figure 4 is a diagrammatic perspective view of one form of operating mechanism for moving the deflector panels of the jet spoiler of Figures 1 to 3 inclusive.

Figures 5 and 6 are diagrams showing the positions of the deflector panels for steering and thrust spoiling, respectively.

Figure 7 is a horizontal sectional view showing air cooling ducts for the deflector, taken as indicated by the line 7 in Figure 4.

Figure 8 is a perspective view, somewhat diagrammatic, showing how spaced jet engines can have their jet blasts controlled in accordance with the present invention.

Figure 9 is a diagram of a toggle linkage suitable for controlling the deflectors shown in Figure 8.

Figure 10 is a sectional view taken as indicated by line 10—10 in Figure 9.

Referring first to Figures 1, 2, and 3 an airplane 1 is provided beneath its fuselage 4 with a pair of side-by-side jet engine nacelles 5 in which the usual jet engines (not shown) are mounted. Each engine has a tail pipe 6 extended rearwardly, with a fairing 9 therebetween separating the jet blasts issuing from the tail pipes 6. It is customary for fairings having skins exposed or adjacent to jet blasts, as in the present illustration, to have such skins formed from heat resistant metal such as stainless steel for example.

In the embodiment shown, a terminal deflector portion 11 of the fairing 9, both sides of which are exposed to the jet blasts, is made movable for jet deflection. This movable portion 11 is mounted as shown in Figures 4 to 7 inclusive.

Fairing 9 is cut away at the rear and bottom thereof and a vertical hollow tube 8 is mounted to rotate in brackets 10 attached to the airplane. Deflector 11 is mounted on tube 8.

Deflector 11 comprises a pair of upper, side-by-side panels 12 rotatable outwardly on tube 8, and a lower single panel 13 fixed to the tube 8; the closed side panels 12 and the lower single panel 13, when centrally positioned, all merging properly into the fairing 9 and offering no significant opposition to the passage of the jet blasts on either side thereof.

The deflector 11 is operated, in the embodiment shown, by a cable lever 14 attached to tube 8 at the top thereof, this lever 14 being attached to rudder pedal lever 15 operated by rudder pedals 16 through deflector cables 17.

Rudder pedal lever 15 also operates the vertical rudder (not shown) of the airplane through rudder cables 19 in the usual manner.

With the operative connections so far recited, movement of the rudder pedals 16 will move the deflector 11 laterally, one way or the other, into the adjacent jet blast, and will divert at least a portion of this blast laterally to provide an additional steering moment on the airplane 1 as shown in Figures 2 and 5. This steering moment, in case of military action where the rudder or its controls might be damaged, will provide some measure of directional control of the airplane.

A more important action of the deflector 11, however, is obtained by separating the panels 12 so that each jet blast is deflected laterally but in opposite directions as shown in Figures 3, 6, and 7. This is accomplished as shown in Figure 4, by running a panel separation cable 20 from a hand lever 21 for example, which is placed within reach of the airplane pilot, downwardly through tube 8 along the aixs of rotation thereof to emerge in lower panel 13 and pass around pulleys 22 which are mounted therein, and is connected to one end of an upright shaft 23 which is supported in panel 13. The shaft 23 is movable vertically, up and down, through pairs of rollers 24 in response to operation of hand lever 21, and has two pairs of fixed collar members 25 affixed to shaft 23. Each pair of collars 25 is spaced from the other by a spacer 26 which is also affixed on shaft 23. Another spacer 26 is affixed to shaft 23, being mounted below the lower pair of collars 25, and abuts a flat collar 27 followed by a spring 28 which encircles the shaft 23 and extends to the lower end thereof. The spring 28 urges the shaft 23 upwardly and maintains the same in the maximum position as shown Each collar 25 is swivelly connected to one end of a toggle arm 29, the other end of each toggle arm 29 being connected to one of the panels 12. In the present example, each panel 12 is connected to one of each pair of toggle arms 29 so that when the hand lever 21 is moved rearwardly, the shaft 23 is relatively moved downwardly against the force of spring 28 to decrease the angle of the toggle arms 29 with respect to the vertical axis of shaft 23, thereby causing each panel 12 to open laterally outwardly, one into each jet blast path so that each jet blast is deflected laterally. The actuating mechanism just described is not, per se, a claimable part of the present invention but is merely recited to offer one well known means of operating the present invention.

The entire structure of the deflector 11 is made from high heat resistant materials, and the entire interior of deflector 11 can readily be air cooled by ram air as indicated by the diagrams of Figures 4 and 7.

As shown in Figure 4, a ram air scoop 33 is provided on each side of the airplane above and ahead of the jet pipes 6. A ram air duct 35 extends rearwardly from each scoop 33 to join and open immediately in front of deflector 11. Each side panel 12 and stationary panel 13 is provided with inlet slots 36 in the leading edges thereof, these slots 36 being open at all times to the joined ram air ducts 35. The trailing edges of the panels 12 and 13 are provided with air outlet slots 37. Thus, the deflector panels 12 and 13 are all cooled by the normal circulation of air therethrough.

In Figures 8, 9, and 10 I have shown the present invention as applied to jet engines which are spaced and arranged so that the deflector components cannot rotate on a common axis.

In this case the spaced jet exhaust pipes 40 are provided with inboard or upper jet protectors 41 of stainless steel for example, to protect the surrounding fuselage structure from the heat of the jet.

Lying normally flat against and outside of each protector 41 is a jet blast deflector plate 42 hinged forwardly adjacent the end of the exhaust pipe 40. Each deflector plate 42 is independently controlled to be swung outwardly into the adjacent jet blast, by a half-toggle arm 44 connected at one end with a deflector plate 42 and at the other end with a slidable key-block 45 which is slidably mounted to move axially of the airplane in a key-way block 46. Each key-block 45 is controlled by an operating rod 47 connected with a handle 49 within reach of the pilot of the airplane. Preferably, handles 49 are coaxially adjacently mounted so that they can be simultaneously or separately operated as indicated in Figure 9.

Simultaneous movement of handles 49 will cause both deflector plates 42 to move outwardly simultaneously to divert both jet blasts laterally, thereby reducing forward thrust. Movement of one handle 49 only will cause deflection of one jet blast only and will cause a steering movement to be applied to the airplane. The system of Figures 8, 9, and 10 can readily be applied to aircraft where each engine is mounted in a wing nacelle.

The lateral deflection of the jet blasts in opposite directions will reduce the forward thrust proportional to the outward position of the panels so that the engine output can be kept relatively high at low speeds. During landings, for example, the pilot is able to maintain a high engine output but is able to reduce speed by opening the deflector panels. Then, in case it is necessary to suddenly climb without landing, the deflector panels or plates can be centered substantially instantaneously to cause rapid closure when released due to the jet pressure thereon. The jets then resume full forward thrust without the necessity of waiting for the engines to reaccelerate.

While I have described the jet deflector system of the present invention as movable for steering, and also for thrust spoiling, it will be obvious to those skilled in the art that the deflector system can be designed for use with either of these actions alone, if it should appear desirable in the premises.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an airplane driven by engines providing a pair of adjacent, side-by-side rearwardly directed jet blasts, a fairing on said airplane positioned between the paths of said blasts and having opposite surfaces closely adjacent the extent of the paths of said blasts, said fairing having a vertical portion thereof movably supported on a vertical pivot at the forward edge of said portion, means for moving said portion laterally into the path of one or the other of said blasts to create a lateral deflection thereof, said vertical portion being divided vertically to define two panels, and means to separate said panels to move one of said panels into the path of one of said jet blasts and the other of said panels into the path of the other of said jet blasts, to deflect said blasts laterally and in opposite directions.

2. In an airplane driven by a pair of jet engines providing forward thrust from a pair of adjacent side-by-side rearwardly directed jet blasts, a vertically disposed deflector positioned between the paths of said blasts and attached to said airplane to rotate on a vertical pivot, means for moving said deflector on said pivot into the path of one or the other of said blasts, said deflector being divided vertically to define two panels forwardly and vertically pivoted in said deflector, and means to separate said panels to simultaneously move one of said panels into the path of one of said jet blasts, and the other of said panels into the path of the other of said jet blasts.

3. In an airplane driven by a pair of jet engines, means for rearwardly directing the output of said engines into a pair of adjacent side-by-side jet blasts, a pair of members forwardly mounted on a vertical pivot attached to said airplane, one of said members having a substantially vertical surface adjacent the inner boundary of the path of one of said jet blasts, the other member having a substantially vertical surface adjacent the inner boundary of the path of the other jet blast, and means for simultaneously moving said members outwardly on their pivots into the paths of said blasts to deflect both of said jet blasts laterally in opposite directions to reduce the forward thrust of said blasts.

4. In an airplane driven by engines providing a pair of adjacent, side-by-side rearwardly directed jet blasts, a fairing on said airplane positioned between the paths of said blasts and having opposite surfaces closely adjacent the extent of the paths of said blasts, said fairing having a vertical portion thereof movably supported on a vertical pivot at the forward edge of said portion, means for moving said portion laterally into the path of one or the other of said blasts to create a lateral deflection thereof, a ram air scoop on said airplane, and duct means connected to duct ram air from said scoop through the inside of said vertical portion.

5. Apparatus in accordance with claim 3 wherein a ram air scoop is provided on said airplane, and duct means connected to duct ram air from said scoop through the interior of both of said members.

References Cited in the file of this patent

UNITED STATES PATENTS

| | | |
|---|---|---|
| 1,723,479 | Goodrich | Aug. 6, 1929 |
| 1,879,187 | Goddard | Sept. 27, 1932 |
| 2,395,809 | Goddard | Mar. 5, 1946 |
| 2,568,813 | Lundberg | Sept. 25, 1951 |

FOREIGN PATENTS

| | | |
|---|---|---|
| 567,072 | Great Britain | Jan. 26, 1945 |
| 928,469 | France | June 2, 1947 |